(12) United States Patent
Zaveri

(10) Patent No.: US 10,097,788 B2
(45) Date of Patent: Oct. 9, 2018

(54) INTELLIGENT RECORDING

(71) Applicant: DISH Technologies L.L.C., Englewood, CO (US)

(72) Inventor: Sagar Zaveri, Highlands Ranch, CO (US)

(73) Assignee: DISH Technologies L.L.C., Englewood, CO (US)

(*) Notice: Subject to any disclaimer, the term of this patent is extended or adjusted under 35 U.S.C. 154(b) by 402 days.

(21) Appl. No.: 13/731,798

(22) Filed: Dec. 31, 2012

(65) Prior Publication Data
US 2014/0189721 A1 Jul. 3, 2014

(51) Int. Cl.
| H04N 5/782 | (2006.01) |
| H04N 21/433 | (2011.01) |
| H04N 21/442 | (2011.01) |
| H04N 21/45 | (2011.01) |
| H04N 21/472 | (2011.01) |

(52) U.S. Cl.
CPC ......... *H04N 5/782* (2013.01); *H04N 21/4334* (2013.01); *H04N 21/44222* (2013.01); *H04N 21/4532* (2013.01); *H04N 21/47214* (2013.01)

(58) Field of Classification Search
CPC ............... H04N 5/782; H04N 21/4334; H04N 21/44222; H04N 21/4532; H04N 21/47214
USPC ........................................................ 725/14
See application file for complete search history.

(56) References Cited

U.S. PATENT DOCUMENTS

| 5,818,440 A | * | 10/1998 | Allibhoy | H04N 7/0888 |
| | | | | 715/718 |
| 7,437,359 B2 | * | 10/2008 | Aguilar-Macias | ........................... |
| | | | | G06F 11/3476 |
| 7,653,896 B2 | * | 1/2010 | Herdeg | G06F 9/45512 |
| | | | | 715/704 |
| 2003/0046696 A1 | * | 3/2003 | Mizuno | H04H 60/46 |
| | | | | 725/46 |
| 2003/0067554 A1 | * | 4/2003 | Klarfeld | G11B 27/105 |
| | | | | 348/461 |
| 2003/0126607 A1 | * | 7/2003 | Phillips | H04N 5/44543 |
| | | | | 725/55 |
| 2004/0255029 A1 | * | 12/2004 | Manion | H04L 12/2803 |
| | | | | 709/227 |
| 2007/0074258 A1 | * | 3/2007 | Wood | H04N 7/17318 |
| | | | | 725/105 |
| 2007/0122108 A1 | * | 5/2007 | Bontempi | H04N 5/782 |
| | | | | 386/297 |
| 2007/0157223 A1 | * | 7/2007 | Cordray et al. | ................. 725/13 |
| 2009/0142035 A1 | | 6/2009 | Kummer et al. | |
| 2009/0148133 A1 | * | 6/2009 | Nomura | G11B 27/105 |
| | | | | 386/248 |
| 2009/0263101 A1 | | 10/2009 | Rudolph et al. | |

FOREIGN PATENT DOCUMENTS

EP 1 437 890 B1 12/2010

* cited by examiner

*Primary Examiner* — Nathan Flynn
*Assistant Examiner* — Tung T Trinh
(74) *Attorney, Agent, or Firm* — Seed IP Law Group LLP

(57) ABSTRACT

An intelligent recording collects data associated with a user's viewing habit of live program contents and determines a viewing pattern by analyzing the collected data. The viewing pattern is used to identify a scheduled program content as a candidate for automatic recording, the identified scheduled program content having fallen within the determined viewing pattern.

16 Claims, 4 Drawing Sheets

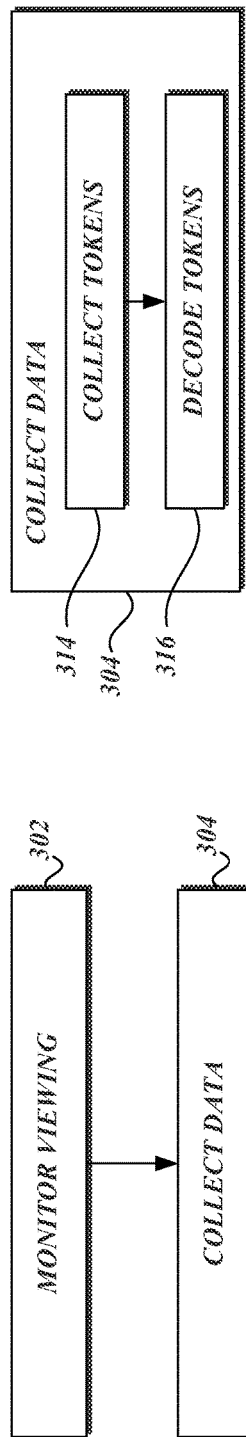
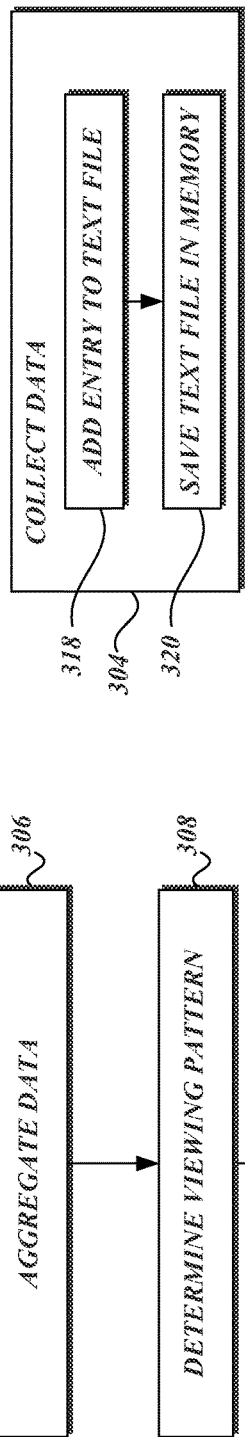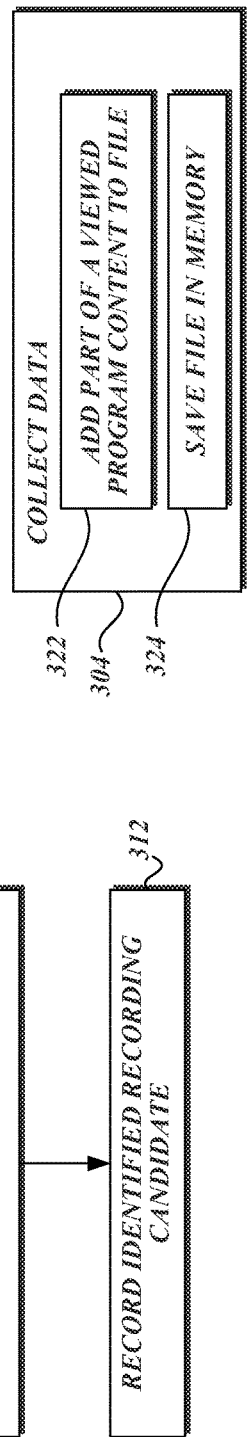
FIG. 4A
FIG. 4B
FIG. 4C
FIG. 3

INTELLIGENT RECORDING

BACKGROUND

Technical Field

The present disclosure relates to intelligent recording of a broadcast program content. In particular, the present disclosure relates to a content receiver with an intelligent recording capability.

Description of the Related Art

Most modern content receivers, such as set top boxes or cable boxes, incorporate some type of recording functionality that allows direct-to-disk recording. This functionality allows users to have more control over their viewing experiences, and as such, the recording function has become indispensable to many users.

Generally, a user sets up, or programs, a timer in his content receiver to record a show on a particular channel at a given time, and the show is recorded without further input from the user. Electronic Program Guides (EPG) have generally made it easier for a user to record a favorite show. With EPG, a user can merely navigate through the EPG GUI, select a show listed in a timeslot, and press a record button to automatically set the timer for the selected program. The large amount of available channels and shows, however, makes for a cumbersome navigation process, as a user has to search through a vast amount of data to find a particular show. This may result in the user missing out on a potentially interesting show.

US Patent Application Publication 2009/0142035 A1 attempts to solve this problem with AUTOMATIC RECORDING. US Patent Application Publication 2009/0142035 A1 discloses a digital video recorder (DVR) that receives a command data from a video transmission system, the command data instructing it to automatically record certain programs or shows. US Patent Application Publication 2009/0142035 A1 attempts to ensure that a user is made aware of shows similar to his favorite shows by automatically recording them. US Patent Application Publication 2009/0142035 A1, however, generally does not address other shortcomings associated with the recording functionality in a content receiver.

BRIEF SUMMARY

Disclosed herein is an embodiment of an intelligent recording method that tracks a user's viewing of live program contents and collects data associated with the user's interaction with a content receiver during his viewing. Analysis of the collected data reveals the user's viewing pattern, and this viewing pattern is used to search through scheduled program contents and to identify a scheduled program content as a candidate for automatic recording.

The intelligent recorder may collect the user's viewing data by collecting and decoding tokens, by adding an entry to a text file for each user's interaction with the content receiver during live viewing of program contents, or by saving a portion of each viewed program content in a video file.

Also disclosed is a content receiver that includes a tuning module, a decoding module, a processing module, a memory module, and a recording module. The processing module includes a central processing module, a data collecting module, and a learning module. The data collecting module monitors a user's viewing habit of live program contents and collects the associated data, while the learning module aggregates the collected data, determines the user's viewing pattern and identifies a candidate program content for automatic recording by the recording module.

BRIEF DESCRIPTION OF THE SEVERAL VIEWS OF THE DRAWINGS

FIG. 3 shows a flow chart of a process for an intelligent recorder to find and record a program content of interest.

FIG. 4A shows a first embodiment of the data collecting process.

FIG. 4B shows a second embodiment of data collecting process.

FIG. 4C shows a third embodiment of data collecting process.

DETAILED DESCRIPTION

Figure 1:
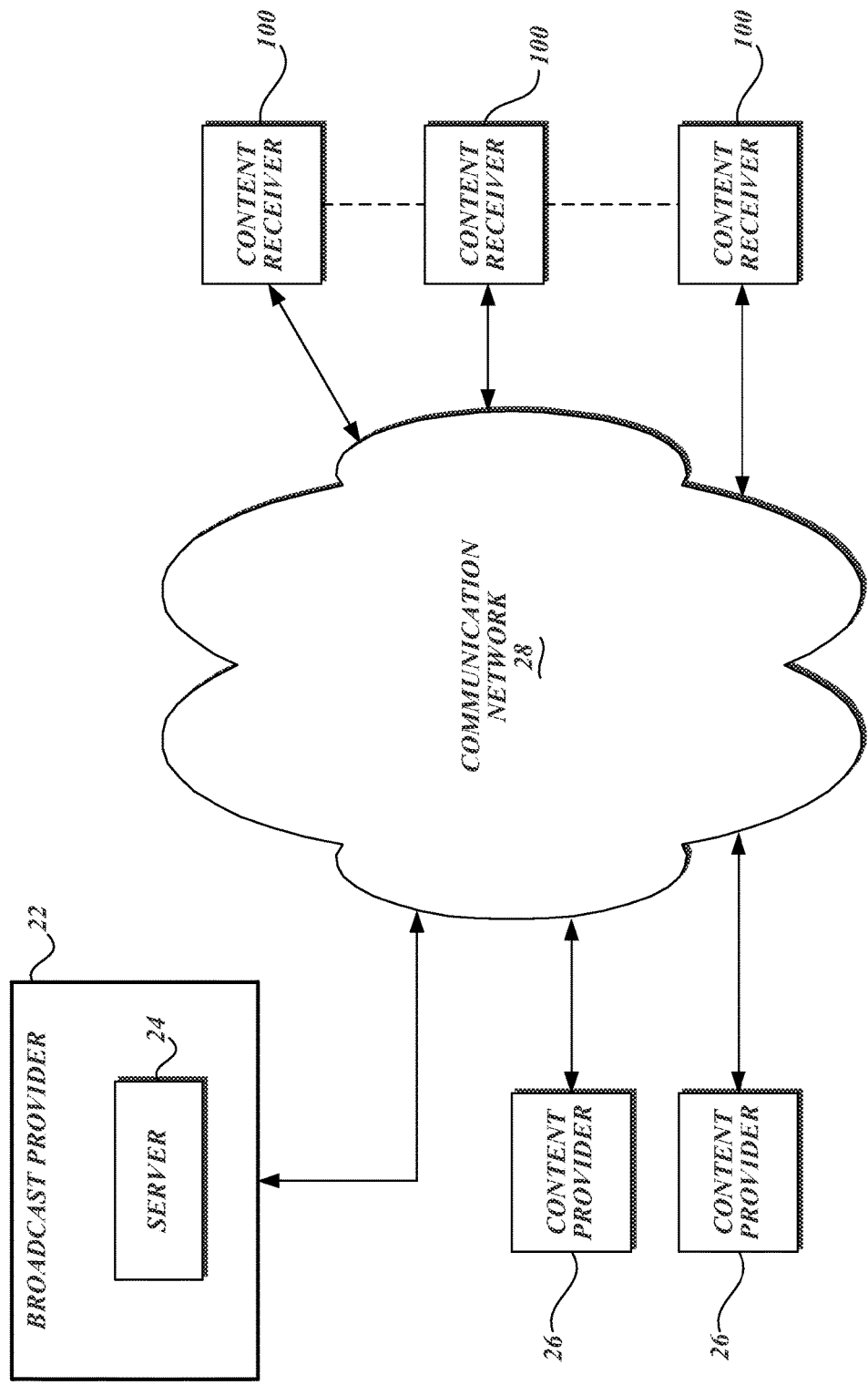
FIG. 1 shows an exemplary broadcast system.

In the following description, certain specific details are set forth in order to provide a thorough understanding of various embodiments of the disclosure. However, one skilled in the art will understand that the disclosure may be practiced without these specific details. In some instances, well-known interfaces have not been described in detail to avoid obscuring the description of the embodiments of the present disclosure.

Unless the context requires otherwise, throughout the specification and claims that follow, the word "comprise" and variations thereof, such as "comprises" and "comprising" are to be construed in an open, inclusive sense, that is, as "including, but not limited to."

Reference throughout this specification to "one embodiment" or "an embodiment" means that a particular feature, structure, or characteristic described in connection with the embodiment is included in at least one embodiment. Thus the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the drawings, identical reference numbers identify similar features or elements. The size and relative positions of features in the drawings are not necessarily drawn to scale.

Referring initially to FIG. 1, an exemplary broadcast system is illustrated to show some of its elements. The broadcast system in FIG. 1 includes a broadcast service provider 22 that houses a server 24, a plurality of content providers 26, a communication network 28, and a plurality of content receivers 100 within the broadcast service provider's service area. The plurality of content providers 26 transmit a variety of contents to the broadcast service provider 22 via the communication network 28. The communication network 28 comprises a collection of channels and nodes connected to enable the transmission and reception of data; the channels may be created with a variety of media such as copper wires, coaxial cable, fiber optics, or radio. Nodes such as repeaters, gateway servers, and satellites may be included. Content providers 26 may use any media in the communication network 28 to transmit contents to the broadcast service provider 22.

A server is defined as a physical computer hardware system with at least one main processor, the server being dedicated to run one or more services to serve the needs of other processors. Server 24 controls the transmissions of program contents from the broadcast service provider 22 to content receivers 100 within the broadcast service provider's service area. Server 24 also receives transmissions from the content receivers 100 and from other servers controlled by the broadcast service provider 22.

Broadcast service provider 22 transmits the program contents as encrypted signals to the content receivers 100 through the communication network 28. In a preferred embodiment, the broadcast service provider 22 is a satellite service provider and transmits encrypted broadcast signals in a certain frequency band via a transmitting antenna at an uplink facility to one or more orbiting satellites that retransmit the encrypted signals back to earth in a different frequency band.

Figure 2:
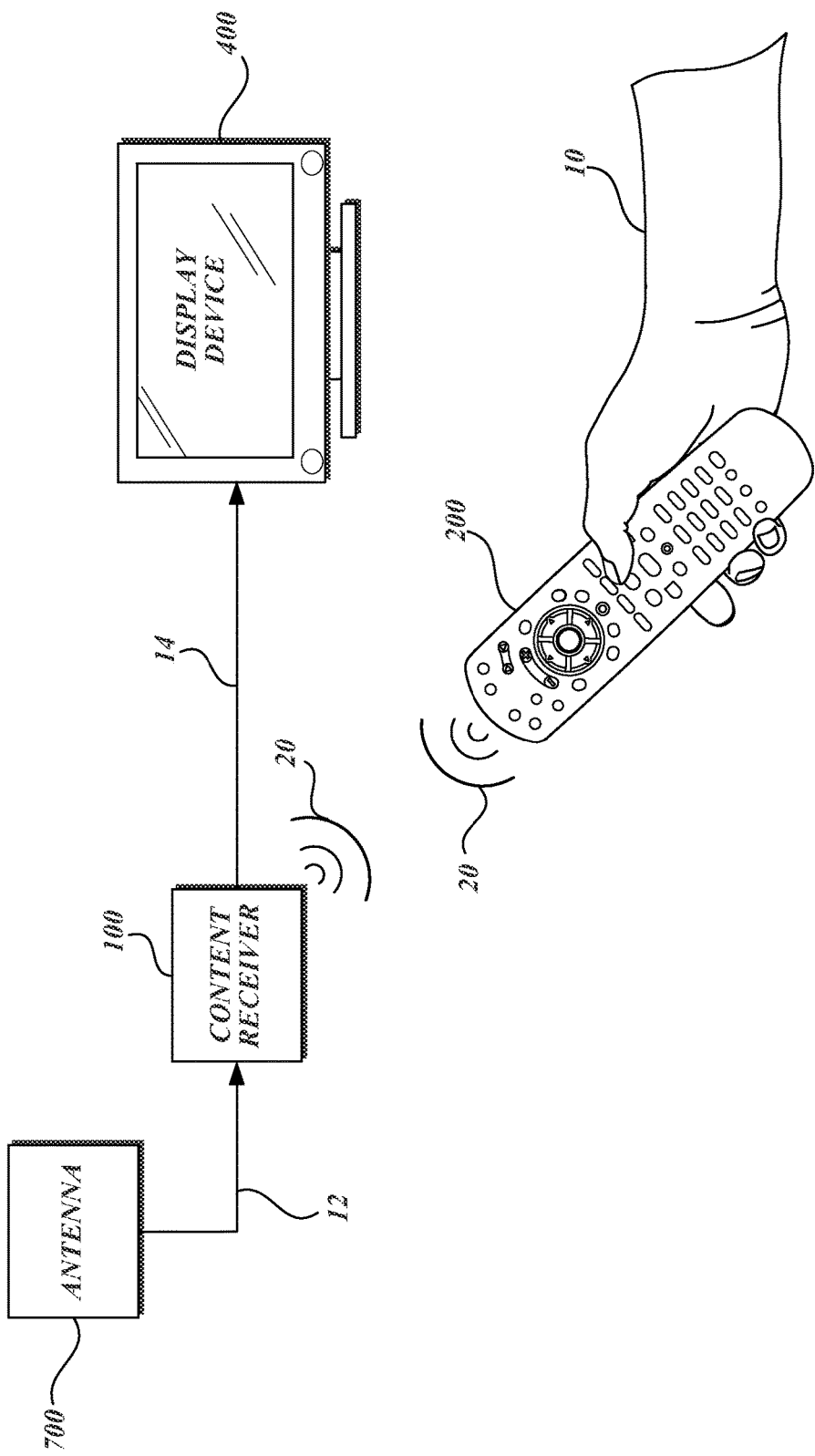
FIG. 2 shows a an exemplary receiving system.

A content receiver 100 is a part of an exemplary receiving system illustrated in FIG. 2. In FIG. 2, the exemplary receiving system includes an antenna 700, the content receiver 100, a display device 400 and a remote control 200. A user 10 communicates with the content receiver 100 using the remote control 200. While viewing a live broadcast, the user 10 uses the remote control 200 to change the viewed channels by actuating one or more buttons or keys on the remote control 200. Remote control 200 may also include a touch pad and the user 10 may use the touch pad to change the viewed channels. Remote control 200 transmits any channel change indications to the content receiver 100 over a wireless interface 20. The wireless interface 20 maybe a radio frequency interface, such as ZigBee, Wi-Fi or Bluetooth, or an optical interface, such as Infrared. Other wireless interfaces are also contemplated.

Antenna 700 is configured to receive the encrypted signals from the communication network 28. The antenna 700 may be a receiving dish or a terrestrial antenna. The content receiver 100 receives a down-converted version of the encrypted signal from antenna 700. It is also contemplated that content receiver 100 receives encrypted or unencrypted signals directly from the communication network 28.

Content receiver 100 is coupled to the antenna 700 over cable 12 and to the display device 400 over cable 14. The content receiver 100 receives an input from the user 10 selecting a program content for live viewing and sends the selected program content to the display device 400. In this document, a program content is sometimes referred to as a "TV show" or "show." The use of the term "TV show" is not to be construed to limit the disclosure to just TV shows, but to encompass all type of program contents available for viewing by a user of the content receiver 100.

The content receiver 100 is further configured to monitor the user's viewing habit, and thus content receiver 100 knows each live program content a user 10 has watched. Suppose that one day, the user 10 by chance found a new program content or TV show while surfing the channels, watched it, and liked it. The next week, the user 10 happened upon another episode of the same TV show and watched it again, but the user 10 never thought of recording it, nor did the user 10 set up a timer in the content receiver 100 to record this TV show. Suppose the user 10 cannot find the TV show on the third week and does not remember the title or on what channel it is presented, and thus cannot watch the TV show live. With intelligent recording, user 10 does not miss the third week's episode of the TV show because the content receiver 100 has recorded the TV show for the user. The content receiver 100 has determined, based on the user's viewing habit in the previous two weeks, in this case watching episodes of the same TV show, that this would be a TV show the user would not want to miss, and would most probably want the content receiver 100 to record it if the user 10 cannot watch it live. The content receiver 100 then notifies the user 10 that the third week's episode of the TV show he missed is available for viewing as a recorded program content.

FIG. 3 illustrates an exemplary process for intelligent recording in a content receiver 100. Content receiver 100 monitors a user's interaction with the content receiver 100 when he is watching live program contents (at 302). In particular, the content receiver 100 tracks any channel selection or channel change made by the user 10. Content receiver 100 collects these data (at 304) and aggregate them over a certain period of time (at 306). The content receiver 100 then analyzes the aggregated data to determine the user's viewing pattern (at 308). The user's viewing pattern may include information indicating "viewing of episodes of a particular TV series for two weeks in a row," or "viewing the same program content each time it is broadcast." The significance of each viewing habit in developing a viewing pattern is determined by the content receiver 100 based on the collected data. Once a viewing pattern is determined, it is used by the content receiver 100 to identify a "recording candidate" or a program content scheduled for future broadcast that would be intelligently recorded. The identification of this recording candidate is based on comparing the "features" in the viewing pattern with the "features" of a scheduled program content, and whether the features of the scheduled program content are substantially similar to the features in the viewing pattern or whether the scheduled program content falls within the viewing pattern (at 310). The "features" may include information closely associated with each program content, such as the name of the program content, the channel it is carried on, the start time, and the broadcast period. The content receiver 100 then proceeds to record the identified recording candidate (at 312).

A first embodiment of the process for collecting data is illustrated in FIG. 4A. As the content receiver 100 monitors the user's interaction with it, it generates tokens, each token representing a user's particular action in controlling his viewing of a live program content. For example, a token is generated when the user selects new channel 125, and another token is generated when the user invokes the EPG. Each token preferably is a binary data that includes a code for the user's activity, the program content selected, and a time stamp. The content receiver 100 continuously collects these tokens, and periodically transmits them to the broadcast service provider 22. Instead of discarding these tokens after their transmission to the broadcast service provider 22, the content receiver 100 retains the tokens to be used for intelligent recording. The content receiver 100 selects tokens associated with live viewing (at 314) and decodes them to extract the underlying data (at 316). In a preferred embodiment, the content receiver 100 uses the metadata accompanying each program content to assist in decoding the tokens.

Each program content is sent as a package that includes metadata, audio and video, the metadata being closely associated with the audio and video in the package. Metadata can be defined as the control and descriptive elements associated with a media content. Structured metadata allows searches on program contents. There are some standardization efforts to specify common technical requirements for metadata, to ensure correct and proper use and interpretation of such data by its owners and users. Digital Video Broadcasting (DVB), an industry-led consortium of over 200 broadcasters, manufacturers, network operators, software developers, regulatory bodies and others in over 35 countries, have established many Standards and Specifications, one of which is related to metadata, which is referred to as "service information" or SI in their documents. Service Information is defined as digital data describing the delivery system, content, and scheduling/timing of broadcast data streams, etc. EN 300 468 specifies Service Information in DVB systems. EN 300 468 specifies SI data that provide identification of services and events for the user; for example, data concerning events or programs such as event name, start time, duration, and data describing services in the systems, such as names of services, and service provider. A summary of the SI may also be made available to describe the streams in the partial bit stream.

A second embodiment of the process for collecting data is illustrated in FIG. 4B. As the content receiver 100 detects a user's interaction with it, it writes an entry into a text file (at 318) and saves the updated text file in memory (at 320). The entry to the text file may include information about the program content being watched by the user 10, and a time stamp. In a preferred embodiment, the information is extracted from the metadata accompanying the program content being watched.

A third embodiment of the process for collecting data is illustrated in FIG. 4C. In this embodiment, instead of adding an entry to a text file, a clip of any viewed program content is taken (at 322) and saved in a file folder in memory (at 324). The clip may be taken once or periodically. The saved clip may include a summary of the SI associated with the viewed program content.

The content receiver 100 is configured to aggregate the data collected over a certain period of time to be used in its analysis. The time period selected determines the amount of data to be aggregated. In a preferred embodiment, two weeks' worth of data is aggregated at a minimum. It is, however, understood that more data leads to better analysis, therefore, it is desirable to aggregate data over a longer period of time. It is also understood that a larger amount of data requires more processing resources. The content receiver 100 decides on the preferred amount of data to aggregate and thus the period over which to aggregate the collected data.

The aggregated data is used in an analysis by the content receiver 100 to determine a viewing pattern of the user. This is a heuristic approach and may be recursive in the long run as new data are added to the analysis. The analysis includes at least searching for a repetitive viewing over a period of time. The content receiver 100 keeps improving the result of its analysis with more data, and the viewing pattern becomes more refined and precise with time. In a preferred embodiment, the viewing pattern is that the user watches multiple episodes of a particular TV show over a period of time, each episode of the particular TV show being a program content. In another embodiment, the viewing pattern is that the user tunes to, and watches, Channel 4 between 8 PM and 9 PM every weekday over a period of time, regardless of what TV Show is presented on Channel 4 at 8 PM. Other viewing patterns of the user are also possible. It is important to emphasize here that the data collected and aggregated for analysis are only those associated with program contents having been viewed live by the user, and do not include data associated with recorded program contents.

The viewing pattern provides the content receiver 100 with information, or features, to be used in identifying a recording candidate for a scheduled automatic recording. The information may include the name of the program content, the channel on which it is carried, and its start time. The content receiver 100 searches through and filters a plurality of scheduled program contents using the information from the viewing pattern and identifies at least one recording candidate, the recording candidate being an upcoming or scheduled program content that falls within the viewing pattern as the information, or features, associated with the recording candidate are substantially similar to the information, or features, associated with the viewing pattern. In the preferred embodiment, the recording candidate is at least carried on the channel and at the time indicated in the viewing pattern. Once identified, the content receiver 100 proceeds to schedule the recording of the recording candidate. If the user 10 misses live viewing of the recording candidate, the next time the user 10 interacts with the content receiver 100, the content receiver 100 provides a notification to the user 10 indicating the availability of the recorded program content. The notification may be presented in the form of a pop-up message on the display screen. Other means to present the notification are also contemplated.

If the user 10 actually views the recording candidate live, the associated recording is deleted and the user's live viewing becomes an added data collected by the content receiver 100.

If the user 10 decides to play back the recorded program content, then the content receiver 100 remembers to keep recording additional program contents that fall within the viewing pattern. If the user 10 deletes the recorded program content without playing it back, the content receiver 100 halts future automatic recording of scheduled program content with information matching the deleted program content. With this heuristic approach, the content receiver 100 improves its intelligent recording performance.

The intelligent recording feature in the content receiver 100 may be implemented as an optional feature. In such a case, the user 10 is provided with an option to enable or disable the intelligent recording feature in a device configuration menu.

Figure 5:
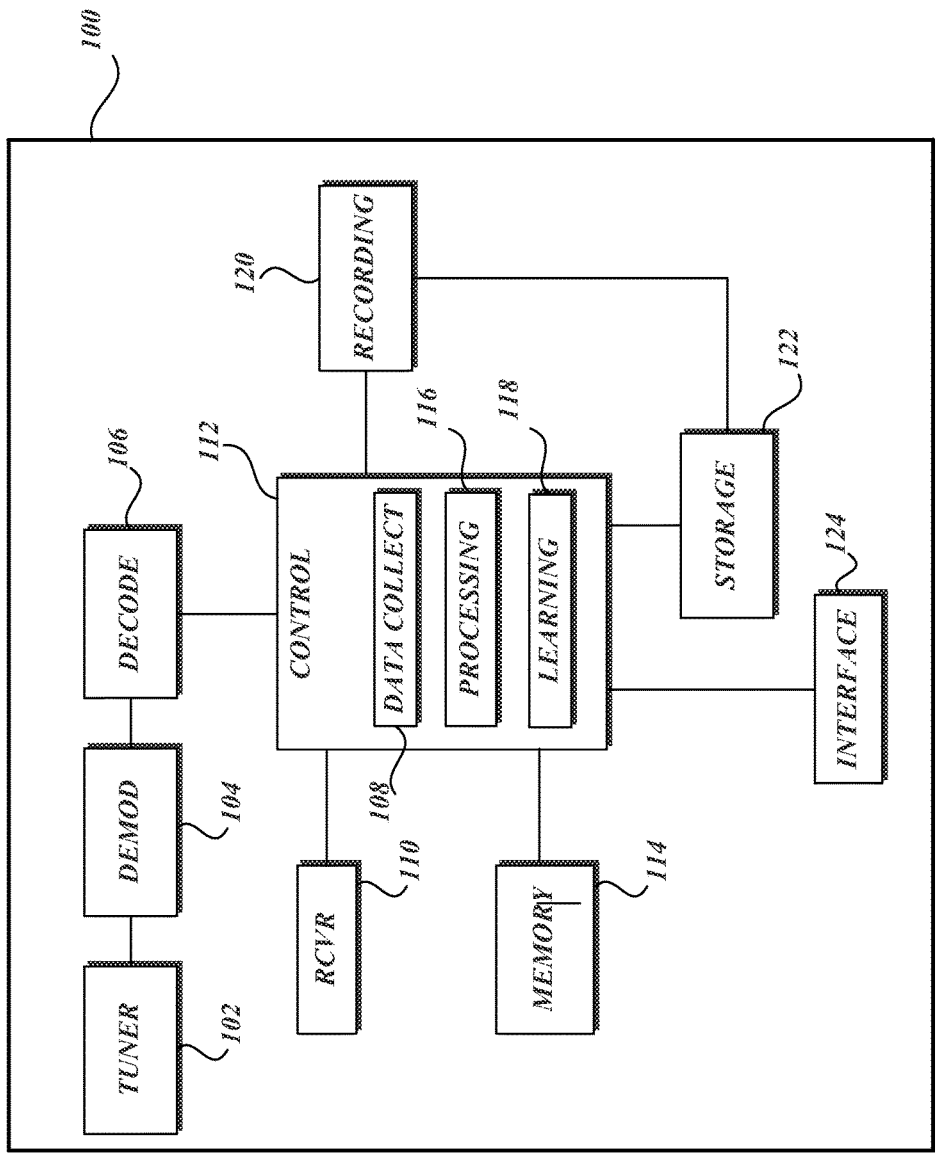
FIG. 5 shows a block diagram of a content receiver.

A possible configuration of the content receiver 100 will now be described. As illustrated in FIG. 5, the content receiver 100 includes a tuning module 102, a demodulating module 104, a decoding module 106, a controlling module 112, a memory module 114, a receiving module 110, a recording module 120, a storage module 122, and an interface module 124.

The tuning module 102 is configured to receive an encrypted signal containing a plurality of program contents, each program content including video, audio and their associated metadata. The encrypted signal is subsequently demodulated by the demodulating module 104 and decoded by the decoding module 106. The decoding module 106 is configured to extract selected program contents from the encrypted signal and send the video, audio and metadata to the controlling module 112.

The controlling module 112 includes a central processing module 116, a data collection module 108, and a learning module 118. The central processing module 116 is configured to oversee the interoperability between the modules in the content receiver 100. The central processing module 116 is further configured to generate menus and notification to a user. The data collection module 108 is configured to monitor a user's viewing activity and to collect data associated with the user's live viewing of program contents. In one embodiment, the data collection module 108 monitors a user's viewing activity by generating a token each time a user interacts with the content receiver 100 while watching a live program content. The data collection module 108 in this embodiment periodically transmits the tokens to the broadcast service provider, keeps a copy of the tokens and decodes them. In another embodiment, the data collection module 108 adds entries to a text file while monitoring the user's viewing activity; an entry is added each time the content receiver 100 detects a user's interaction with the content receiver 100 during live viewing of a program content. The text file is updated and saved in the memory module 114 with each entry. In yet another embodiment, the data collection module 108 monitors a user's viewing activity by extracting a clip from each watched live program content and saving the clip in a video file. The clip may be extracted once or periodically. The clip may be saved together with a summary SI associated with the live program content. The video file is updated and saved in the memory module 114 with each clip addition. The memory module 114 is accessible by the controlling module 112 and is configured to store the instructions to be executed by the controlling module 112 and any associated data in volatile and nonvolatile memory devices. Nonvolatile memory device such as FLASH, FRAM or MRAM, and volatile memory device such as SRAM and DRAM may be used. Other types of volatile and nonvolatile memory devices may also be included in the memory module 114.

The learning module 118 is coupled to the data collection module 108 and is configured to aggregate data that have been collected by the data collection module 108 over a determined period of time. The determined period of time may be as short as one week and as long as four weeks. In a preferred embodiment, a period of two weeks is used for each data aggregation by the learning module 118. Data aggregation may be done periodically, meaning that data is collected over a set time period, and only those data is used for the analysis. Alternatively, data aggregation may be done cumulatively, meaning that aggregated data from the first time period is used in aggregating data from the second time period. Cumulative aggregation leads to improved analysis, but requires more time and computing resources to process.

The learning module 118 is further configured to determine a user's viewing pattern by analyzing the aggregated data, and to use the determined viewing pattern to search for a scheduled program content that falls within the determined viewing pattern. The learning module 118 identifies that scheduled program content as a recording candidate. The identified recording candidate is then forwarded to the recording module 120 to be recorded at its scheduled time.

The learning module 118 is also configured to receive a plurality of input from the central processing module 116. An input may be an indication of whether intelligent recording is enabled. Another input may be an indication that a user has deleted a program content that was intelligently recorded before playing it back. The learning module 118 uses the plurality of input from the central processing module 116 to assist in its heuristic learning and to improve both its viewing pattern determination and recording candidate identification processes.

The recording module 120 is configured to set up a recording timer to automatically record the identified recording candidate to the storage module 122. The storage module 122 may include a solid state drive, a hard disk drive, an optical drive, or a plurality of any one of these drives.

The interface module 124 is coupled to the controlling module 112 and is configured to process audio and video signals before they are sent to the display device 400.

The receiving module 110 is configured to receive transmissions from the remote control 200 over the wireless interface 20. In a preferred embodiment, the wireless interface is a radio frequency communication link, but an optical communication link is also contemplated.

Each of the modules discussed in this description may be implemented as hardware, software, firmware or a combination thereof. Modules may be combined and implemented in one package or build. A module may also be further broken down into submodules and implemented as such.

The various embodiments described above can be combined to provide further embodiments. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method comprising:
monitoring interaction between a user and a content receiver during presentation of a plurality of live program contents, the monitoring including generating a viewing token that represents an interaction between the user and the content receiver, the viewing token including an activity code that indicates a user action in controlling a program content, an identifier of the program content and a time stamp;
collecting data associated with the user's viewing of the plurality of live program contents, the data including the viewing token;
aggregating the collected data over a selected period of time;
determining a viewing pattern based on an analysis of the aggregated data;
identifying a recording candidate for a scheduled automatic recording, the recording candidate being an upcoming program content falling within the determined viewing pattern;
automatically recording the identified recording candidate as a recorded program content, and
notifying the user of an availability of the recorded program content for playback.

2. The method as claimed in claim 1, wherein the analysis to determine the viewing pattern disregards the user's recording history.

3. The method as claimed in claim 1, wherein collecting data comprises:
for each viewing of a live program content, placing an entry in a text file, the entry including at least a program information of the viewed program content; and
storing the text file in a memory location.

4. The method as claimed in claim 1, wherein collecting data comprises:
for each viewing of a live program content, storing at least a portion of the viewed live program content in a video file; and
storing a separate copy of the video file in a memory location.

5. The method as claimed in claim 1 further comprising:
detecting a deletion of the automatically recorded program content, the deletion carried out by the user before a playback of the recorded program content;
in response to the detected deletion, disabling future automatic recording of the deleted program content.

6. The method as claimed in claim 1 further comprising:
requesting an input from the user, the input controlling an intelligent recording function in the content receiver, and wherein automatically recording is enabled only if the input enables the intelligent recording function.

7. The method as claimed in claim 1 wherein aggregating the collected data is done periodically.

8. The method as claimed in claim 1 wherein aggregating the collected data is done cumulatively.

9. The method as claimed in claim 1 wherein notifying the user comprises presenting a graphical user interface on a display device.

10. A content receiver comprising:
a tuning module configured to receive a signal;
a decoding module configured to decode a selected program content from the received signal, the selected program content including video, audio and metadata;
a processing module including
  a central processing module configured to generate user notifications and to receive a plurality of input from a user,
  a data collecting module configured to
    monitor the user's viewing habit of live program contents by generating a viewing token that represents an interaction between the user and the content receiver, the viewing token including an activity code that indicates a user action in controlling a program content, an identifier of the program content and a time stamp, and
    collect data associated with the user's viewing habit, the data including the viewing token, and
  a learning module configured to
    aggregate the collected data over a selected period of time,
    determine a viewing pattern by analyzing the aggregated data, and
    identify a recording candidate, the recording candidate being a scheduled program content that falls within the determined viewing pattern; and
a recording module configured to automatically record the recording candidate.

11. The content receiver as claimed in claim 10 wherein the data collecting module collects data by
adding an entry to a text file each time the user interacts with the content receiver during viewing of live program contents, and
updating and storing the text file in memory.

12. The content receiver as claimed in claim 10 wherein the data collecting module collects data by
adding to a video file, a clip of each live program content the user watches, and
updating and storing a separate copy of the video file in memory.

13. The content receiver as claimed in claim 12, wherein the clip is saved together with a summary service information associated with the live program content.

14. The content receiver as claimed in claim 10 wherein the learning module disregards data associated with the user's recording history.

15. The content receiver as claimed in claim 10 wherein the learning module aggregates the collected data cumulatively.

16. The content receiver as claimed in claim 10 wherein the plurality of user input includes an indication to delete the automatically recorded program content before it is played back.

* * * * *